(12) United States Patent
Knapp et al.

(10) Patent No.: US 8,987,957 B2
(45) Date of Patent: Mar. 24, 2015

(54) SYSTEMS AND METHODS FOR FACILITATING OIL FLOW IN RELATION TO ROTOR BEARINGS

(71) Applicant: Baker Hughes Incorporated, Houston, TX (US)

(72) Inventors: John M. Knapp, Claremore, OK (US); Scott E. Strope, Claremore, OK (US)

(73) Assignee: Baker Hughes Incorporated, Houston, TX (US)

( * ) Notice: Subject to any disclaimer, the term of this patent is extended or adjusted under 35 U.S.C. 154(b) by 249 days.

(21) Appl. No.: 13/742,458

(22) Filed: Jan. 16, 2013

(65) Prior Publication Data
US 2014/0197704 A1    Jul. 17, 2014

(51) Int. Cl.
H02K 5/10    (2006.01)
H02K 7/08    (2006.01)
H02K 5/132   (2006.01)
H02K 5/167   (2006.01)

(52) U.S. Cl.
CPC .................. *H02K 7/08* (2013.01); *H02K 5/132* (2013.01); *H02K 5/167* (2013.01); *H02K 5/1672* (2013.01)
USPC .............................................. 310/87; 310/90

(58) Field of Classification Search
CPC ...... H02K 5/132; H02K 5/1672; H02K 5/167
USPC ..................................... 310/87–90
See application file for complete search history.

(56) References Cited

U.S. PATENT DOCUMENTS

| | | | | |
|---|---|---|---|---|
| 4,119,874 A | * | 10/1978 | Beavers et al. | 310/90 |
| 4,513,215 A | * | 4/1985 | Del Serra | 310/90 |
| 4,521,708 A | * | 6/1985 | Vandevier | 310/87 |
| 4,890,937 A | * | 1/1990 | Balsells | 384/16 |
| 5,436,515 A | * | 7/1995 | Ide | 310/90 |
| 5,719,454 A | * | 2/1998 | Halsey et al. | 310/90 |
| 6,091,175 A | * | 7/2000 | Kinsinger | 310/90 |
| 6,566,774 B2 | * | 5/2003 | Parmeter et al. | 310/90 |
| 6,956,310 B1 | | 10/2005 | Knox | |
| 2011/0037332 A1 | | 2/2011 | Neuroth | |

* cited by examiner

*Primary Examiner* — Thanh Lam
(74) *Attorney, Agent, or Firm* — Law Offices of Mark L. Berrier

(57) ABSTRACT

Systems and methods for rotor bearings that enable improved oil circulation, wherein axial grooves are formed in the outer periphery of each bearing to form channels that allow axial flow of oil through the channels. Each bearing includes a collar, a sleeve and an interference ring. The collar has a bore through its center in which a rotatable sleeve is positioned. The outer periphery of the collar has a circumferential groove and at least one axial groove that extends from one face of the collar to the other. An axially permeable interference ring positioned within the circumferential groove extends radially outward from the groove beyond the outer periphery of the collar. The interference ring (e.g., a looped coil spring) allows fluid in the axial groove to flow through the interference ring. The axial groove may have a different depth than the circumferential groove.

12 Claims, 4 Drawing Sheets

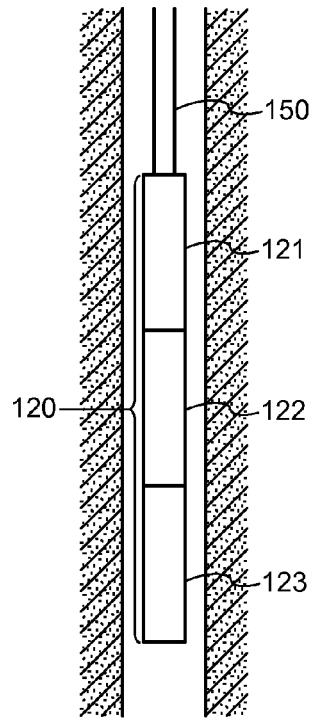
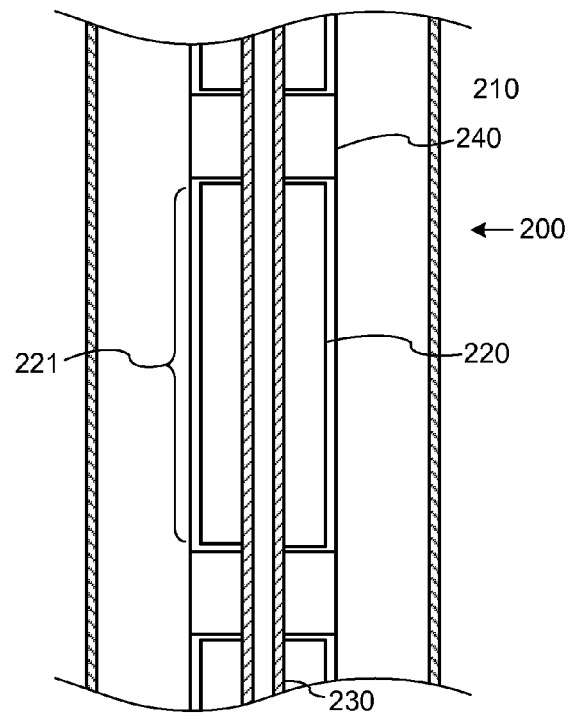
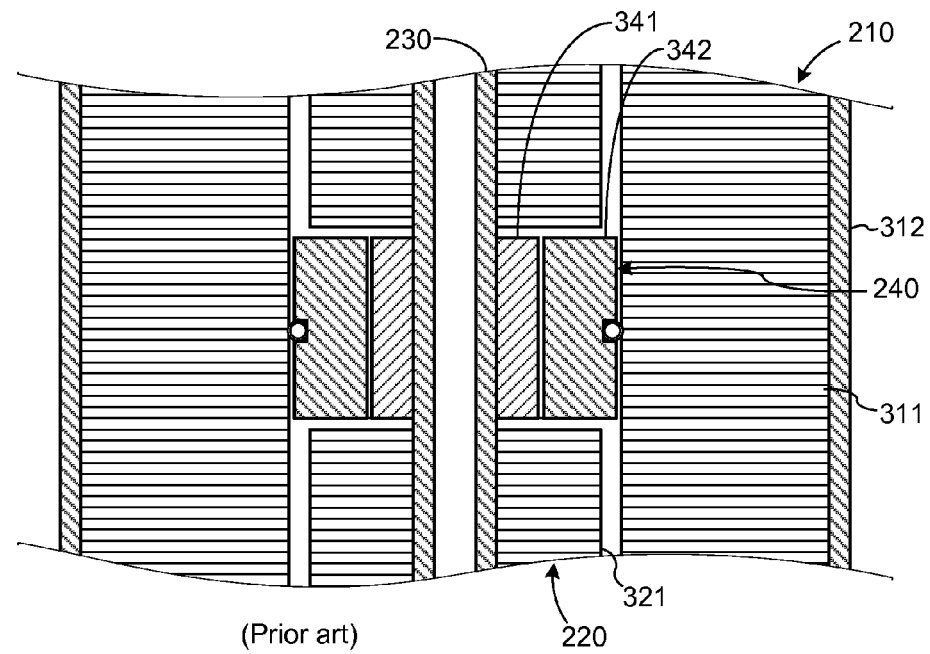
(Prior art)
Fig. 1
(Prior art)
Fig. 2
(Prior art)
Fig. 3

SYSTEMS AND METHODS FOR FACILITATING OIL FLOW IN RELATION TO ROTOR BEARINGS

BACKGROUND

1. Field of the Invention

The invention relates generally to rotor bearings, and more particularly to rotor bearings that employ an axial groove at the outer periphery thereof to facilitate axial fluid flow through the bearing.

2. Related Art

Oil and natural gas are often produced by drilling wells into oil reservoirs and then pumping the oil and gas out of the reservoirs through the wells. If there is insufficient pressure in the well to force these fluids out of the well, it may be necessary to use an artificial lift system in order to extract the fluids from the reservoirs. A typical artificial lift system employs an electric submersible pump which is positioned in a producing zone of the well to pump the fluids out of the well.

An electric submersible pump system includes a pump and a motor which is coupled to the pump and drives the pump. The electric submersible pump system may also include seals, gauge packages and other components. Because they are designed to fit within the borehole of a well, electric submersible pump systems are typically less than ten inches wide, but may be tens of meters long. The motor of an electric submersible pump system may produce hundreds of horsepower.

The motor of the electric submersible pump system is typically an AC induction motor. The motor has a stator that is cylindrical with a coaxial bore. A rotor is coaxially positioned within the bore of the stator. The rotor is coupled to a shaft so that rotation of the rotor turns the shaft. Bearings hold the rotor in position within the bore of the stator and allow the rotor to rotate within the bore.

It is important to the longevity of the motor that the bearings not be permitted to rotate against the stator. If the bearings are allowed to rotate against the stator, the stator may experience unnecessary wear and eventual damage to the electrical wires contained within the stator. This may result in the failure of the motor. Despite the need to prevent the bearings from rotating against the stator, it is also important that the bearings must be able to move axially within the stator. Allowing this axial movement facilitates assembly of the motor and also allows the bearings and rotors to move within the stator in response to thermal expansion of the motor components.

These requirements may be met by providing a ring around the periphery of each bearing that impedes the rotation of the bearing against the stator, but allows axial movement of the bearing with respect to the stator. Because the ring provides an interference fit between the bearing and the stator, it will be referred to herein as an interference ring. The interference ring may be, for example, an elastomeric T-ring, or a coil spring which fits within a circumferential groove or channel or the periphery of the bearing and extends outward from the groove to a greater diameter than the outer diameter of the bearing.

SUMMARY OF THE INVENTION

ESP motors generally incorporate means to enable recirculating oil flow, which is considered to be beneficial to the operation of the motor. The motor shaft is typically hollow, so oil conventionally flows up through the interior of the hollow motor shaft and then flows back down through the gap between the stator and rotor. Because the interference rings of the bearings, particularly in the case of T-rings, block the gap between the rotor and stator, holes are conventionally drilled through the body of each bearing between the inner diameter of the bearing and the circumferential groove in the periphery of the bearing in order to allow the oil to pass through the bearing. This allows a continuous flow of oil through the bearing, and consequently the motor.

In some applications, however, it is desirable to provide design the electric submersible pump system with an outer diameter that is small enough to eliminate the space in which the oil passageways are normally drilled. The present systems and methods therefore utilize coiled-spring interference rings and provide axially oriented grooves in the peripheries of the bearings, thereby enabling oil flow through the axial grooves and through the coiled-spring interference rings. The axial grooves may vary in number, and may be configured to provide a step or notch in the circumferential grooves to impede rotation of the interference rings in the circumferential grooves.

This disclosure is directed to systems and methods for rotor bearings that solve one or more of the problems discussed above. One particular embodiment comprises a bearing for a motor in an electric submersible pump system. The bearing includes a collar, a sleeve and an interference ring. The collar has a bore through its center and an outer periphery having a circumferential groove in it. The outer periphery of the collar also has at least one axial groove that extends from one axial face of the collar to the other. The sleeve is rotatably positioned within the bore of the collar. The sleeve and collar are coaxial. The interference ring is positioned within the circumferential groove, the interference ring extending radially outward from the groove beyond the outer periphery of the collar, wherein the interference ring allows axial fluid in the axial groove to flow axially through the interference ring. In one embodiment, the interference ring is a coil spring that is curved to form a loop. The ends of the coil spring may be connected (e.g., welded together) to maintain the looped shape of the spring. In alternative embodiments, other types of interference rings may be used. There may be one or more axial grooves. In one embodiment, the axial groove has a depth that is different from the depth of the circumferential groove, so that the floor of the circumferential groove is stepped at the junction with the axial groove. This helps to prevent the interference ring from rotating within the circumferential groove. The axial groove may be deeper or more shallow (or the same depth) as the circumferential groove.

Another embodiment comprises an electric submersible pump system. The system includes a pump and a motor which is coupled to the pump and drives the pump. The motor includes a stator and a rotor positioned coaxially within a bore of the stator. The motor has multiple rotor bearings that support the rotor within the bore of the stator. Each bearing has a collar, a sleeve and an interference ring. The collar has a bore through its center in which the sleeve is rotatably positioned. The collar has an outer periphery with a circumferential groove, and the interference ring is positioned within this groove. The interference ring may, for example, be a coil spring. The outer periphery of the collar also has at least one axial groove that extends from one axial face of the collar to the other. The interference ring extends radially outward from the groove beyond the outer periphery of the collar to engage the inner diameter of the stator. The interference ring allows axial fluid in the axial groove to flow therethrough. The axial groove may have a depth that is different from the depth of the circumferential groove, so that the floor of the circumferential groove is stepped at the junction with the axial groove.

Numerous other embodiments are also possible.

BRIEF DESCRIPTION OF THE DRAWINGS

Other objects and advantages of the invention may become apparent upon reading the following detailed description and upon reference to the accompanying drawings.

FIG. 1 is a diagram illustrating some of the primary components of an electric submersible pump system.

FIG. 2 is a diagram illustrating the structure of an exemplary motor suitable for use in an electric submersible pump system.

FIG. 3 is a more detailed diagram illustrating the structure of an exemplary motor suitable for use in an electric submersible pump system.

Figure 4A:
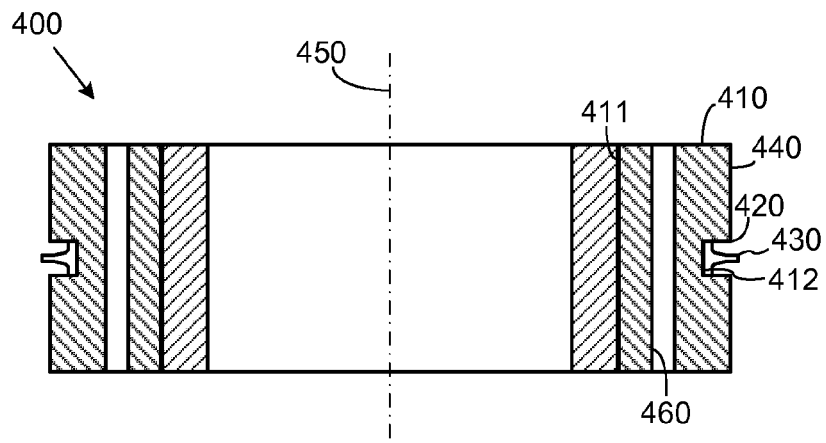
FIGS. 4A and 4B are diagrams illustrating the structure of an exemplary prior art rotor bearing having a T-ring type interference ring.

While the invention is subject to various modifications and alternative forms, specific embodiments thereof are shown by way of example in the drawings and the accompanying detailed description. It should be understood, however, that the drawings and detailed description are not intended to limit the invention to the particular embodiment which is described. This disclosure is instead intended to cover all modifications, equivalents and alternatives falling within the scope of the present invention as defined by the appended claims. Further, the drawings may not be to scale, and may exaggerate one or more components in order to facilitate an understanding of the various features described herein.

DETAILED DESCRIPTION OF EXEMPLARY EMBODIMENTS

One or more embodiments of the invention are described below. It should be noted that these and any other embodiments described below are exemplary and are intended to be illustrative of the invention rather than limiting.

As described herein, various embodiments of the invention comprise systems and methods for improving the flow of oil through motors such as electric submersible pump motors by providing axial grooves or channels on the peripheries of the rotor bearings to increase the amount of oil that can flow between the bearings and the inner diameter of the stator in which they are mounted.

Referring to FIG. 1, a diagram illustrating the components of an electric submersible pump system in one embodiment. In this embodiment, an electric submersible pump system is implemented in a well for producing oil, gas or other fluids. An electric submersible pump system 120 is coupled to the end of tubing string 150, and the electric submersible pump system and tubing string are lowered into the wellbore to position the pump in a producing portion of the well. A drive system (not shown) at the surface of the well provides power to the electric submersible pump system to drive the system's motor.

Electric submersible pump system 120 includes a pump section 121, a seal section 122, and a motor section 123. Electric submersible pump system 120 may include various other components which will not be described in detail here because they are well known in the art and are not important to a discussion of the invention. Motor section 123 is coupled by a shaft through seal section 122 to pump section 121. Motor section 123 rotates the shaft, thereby driving pump section 121, which pumps the oil or other fluid through the tubing string and out of the well.

Referring to FIG. 2, a diagram illustrating the structure of an exemplary motor suitable for use in an electric submersible pump system is shown. As depicted in this figure, motor 200 has a stator 210 and a rotor 220. Stator 210 is generally cylindrical, with a coaxial bore that runs through it. Rotor 220 is coaxially positioned within the bore of stator 210. Rotor 220 is attached to a shaft 230 that is coaxial with the rotor and stator 210. In this example, rotor 220 includes multiple sections (e.g., 221), where bearings (e.g., 240) are positioned at the ends of each section. The bearings support shaft 230, and consequently rotor 220, within the bore of stator 210 and allow the rotor and shaft to rotate within the stator.

Referring to FIG. 3, a diagram illustrating the structure of motor 200 in more detail is shown. It can be seen in this figure that stator 210 is formed by stacking a set of thin, substantially identical plates or laminations (e.g., 311). The laminations are generally annular in shape, so that when they are stacked together, they form a generally cylindrical shape, with a coaxial, cylindrical bore in the center. The diameter of the bore of the stator may be referred to herein as the inner diameter of the stator. The stacked laminations are pressed into a housing 312 to form the stator assembly 210. It should be noted that the laminations need not be exactly identical. Similarly, the laminations need not be perfectly annular (for example, the laminations may form a key or keyway that mates with a corresponding structure of housing 312 to prevent the stacked laminations from rotating within the housing.

The construction of rotor 220 is similar to that of stator 210, in that the rotor sections are formed by stacking corresponding sets of laminations (e.g., 321). The laminations are again essentially annular, having an outer diameter that is slightly less than the inner diameter of stator 220, and an inner diameter that is substantially equal to the outer diameter of shaft 230. Each set of laminations is stacked and shaft 230 is positioned through the bore formed through the stacked rotor laminations. The shaft and laminations may be keyed to prevent the laminations from rotating with respect to the shaft.

Rotor 220 is held in position within stator 210 by the rotor bearings (e.g., 240). As noted above, there are multiple bearings, each of which is positioned between (or at an end of) the rotor sections. Each bearing in this embodiment has an inner portion (a sleeve) 341 that fits within an outer portion (a collar) 342. Sleeve 341 fits against and rotates with shaft 230. Collar 342 fits within the bore of stator 210 and remains stationary as sleeve 341 rotates within the collar. It should be noted that, although bearing 240 in this embodiment uses the simple arrangement of sleeve 341 and collar 342 to enable the free rotation of rotor 220 within stator 210, other embodiments may use bearings that incorporate more complex designs and features to facilitate the rotation of the rotor.

As noted above, it is important to prevent the bearings from rotating with respect to the stator because this will normally result in wear to the stator and resulting damage to the electrical wires in the stator, which may cause failure of the motor. While the bearings should not be allowed to rotate with respect to the stator, they must be able to move axially within the stator (in the direction of the stator's axis). This axial movement is necessary to permit assembly of the motor, and also to allow the bearings and rotor sections to move within the stator in response to thermal expansion forces.

Figure 4B:
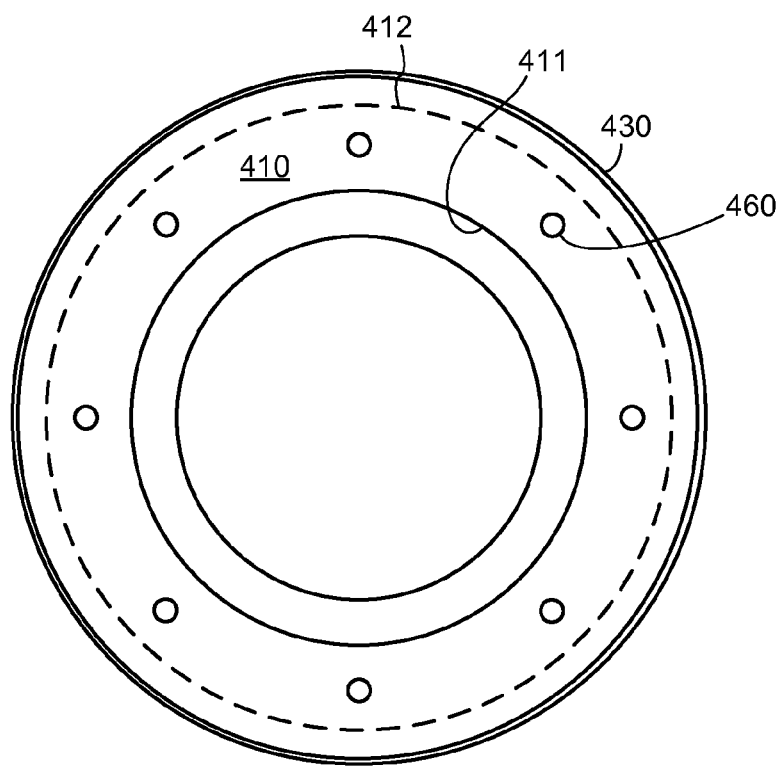

One frequently implemented mechanism for restricting the movement of the bearings in this manner is through the use of an elastomeric "T-ring" type interference ring at the outer periphery (the radially outward-facing surface) of the bearing. This mechanism is illustrated in FIGS. 4A and 4B. FIG. 4A is a cross sectional side view of the bearing, while FIG. 4B is a top view of the bearing. In these figures, a circumferential groove or channel 420 is provided in the outer periphery 440 of collar 410. An elastomeric T-ring 430 is seated in circumferential groove 420 and extends radially outward (away from axis 450) so that it extends slightly beyond the outer diameter of the bearing. The outer diameter of T-ring 430 is greater than the inner diameter of the stator (i.e., the diameter of the bore through the stator), so that when the bearing is inserted into the stator bore, the T-ring contacts the stator and provides an interference fit of the bearing within the stator. The geometry of T-ring 430 is designed to maintain outward force against the stator bore, thereby countering torque forces that would tend to rotate the bearing in the stator bore. At the same time, the design minimizes the axial force required to move the bearing axially in the stator bore. As shown in FIG. 4B, collar 410 has a set of oil holes (e.g., 460) therethrough to allow oil to flow through the bearing (thereby allowing the oil to circulate through the motor). The oil holes are necessary because T-ring 430 blocks oil from flowing through the gap between the bearing and the stator.

As noted above, T-ring 430 is formed using an elastomeric material. This technology works well in many applications, but it has significant limitations, primarily due to material limitations inherent to elastomers. Elastomeric materials (even high-end expensive elastomeric materials) tend to be less effective at elevated temperatures. In particular, at the temperatures that are beginning to be seen in SAGD (steam assisted gravity drainage)/geothermal ESP applications, elastomers simply become unusable due to their loss of elasticity and the onset of chemical decomposition.

Figure 5A:
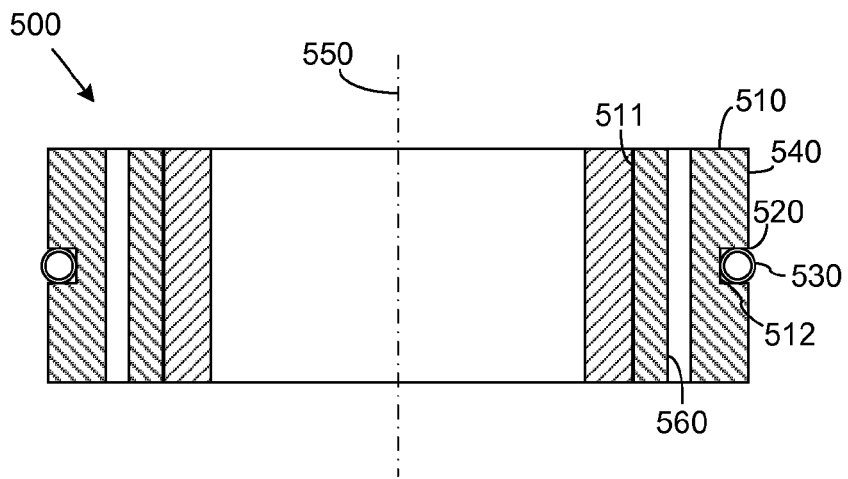
FIGS. 5A and 5B are diagrams illustrating the structure of an exemplary prior art rotor bearing having a coil spring type interference ring.
Figure 5B:
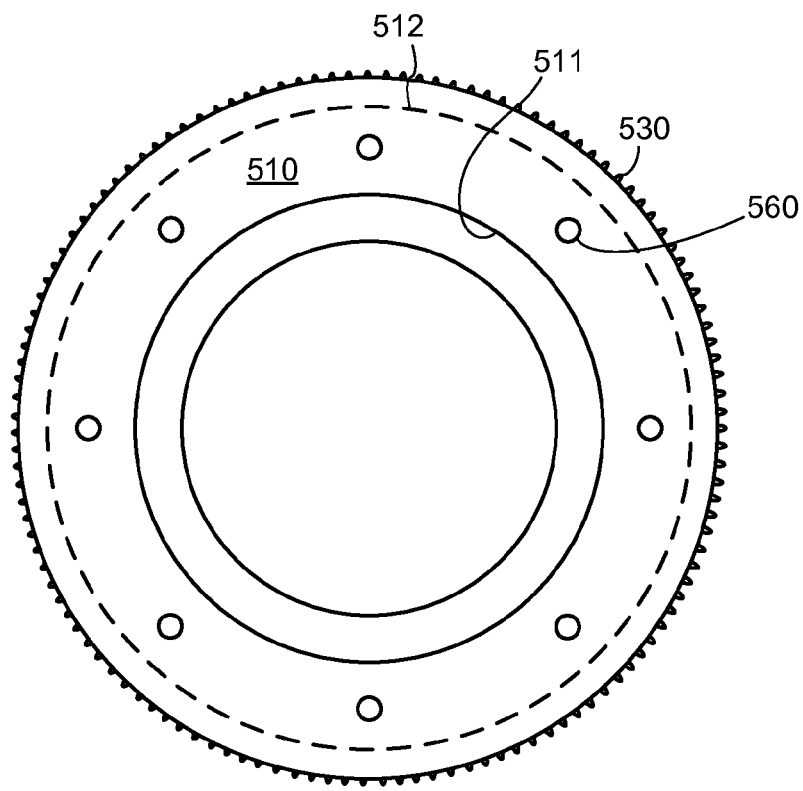

Referring to FIGS. 5A and 5B, an alternative bearing design is shown. This design maintains the simplicity and cost effectiveness of elastomeric T-ring technology, but eliminates the elastomer of the T-ring. Instead of using an elastomeric T-ring, bearing 500 uses a long coil spring 530 as an interference ring. Coil spring 530 is bent into a loop, and the ends of the spring are welded together to maintain the looped shape. Spring 530 is positioned in a circumferential groove 520 in the outer periphery 540 of collar 510. Spring 530 is sized to extend radially outward from the bearing to a diameter that is slightly larger than the inner diameter of the stator bore. Spring 530 thereby provides an interference fit between bearing 500 and the stator. The natural elasticity of coil spring 530 provides an outward force against on the stator bore, thereby providing significant resistance to rotational forces while simultaneously allowing the bearing to move with axially in the stator. Because spring 530 is not subject to the temperature limitations of elastomeric T-ring 530, the temperature range of bearing 500 is extended beyond that of bearing 400 and enables bearing 500 to operate in extreme temperature applications. While spring 530 does not completely block the gap between collar 510 and the stator, it is still necessary to provide oil holes (e.g., 560) through the collar to enable sufficient oil flow through/around the bearing.

It should be noted that, for each of bearings 400 and 500, the oil holes are located in the portion of the collar between the inner diameter (411, 511) of the collar (410, 510) and the floor (412, 512) of the circumferential groove. Increasingly, there is a demand for smaller-diameter motors. The diameters of various motor components (such as the rotor bearings) must therefore also decrease. A decrease in the diameters of the bearings results in a reduced amount of space between the bearing inner diameter (411, 511) and the floor (412, 512) of the circumferential groove. Consequently, it may not be possible to provide oil holes through the collar, or to enable sufficient oil flow through/around the bearing.

Figure 6A:
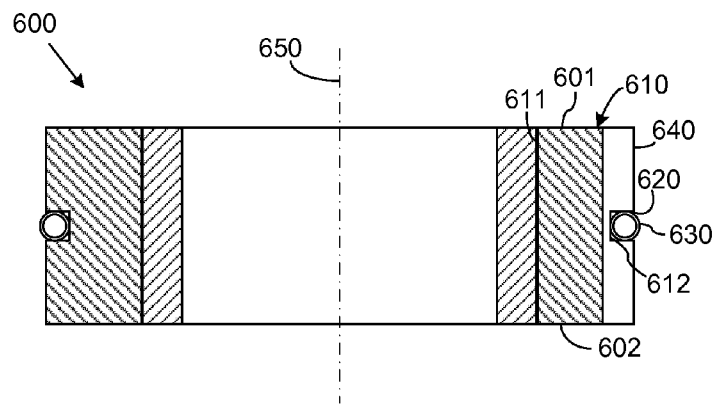
FIGS. 6A-6C are diagrams illustrating the structure of an exemplary rotor bearing having axial grooves in the outer periphery of the bearing in accordance with one embodiment.
Figure 6B:
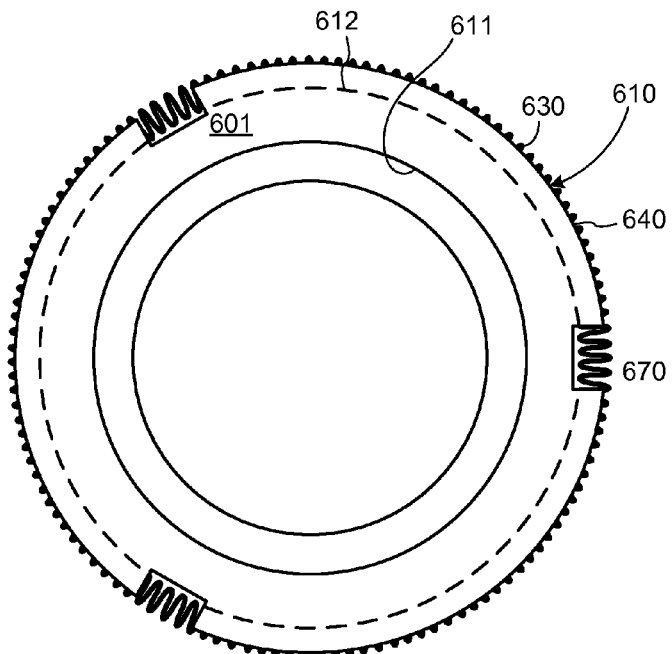
Figure 6C:
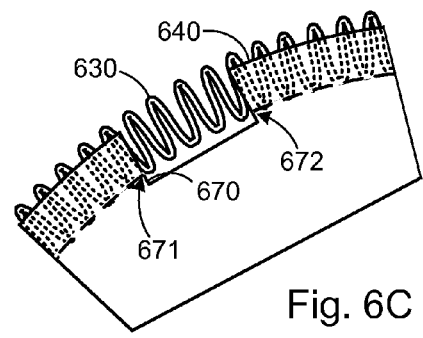

Referring to FIGS. 6A and 6B, a pair of diagrams illustrating the structure of an exemplary embodiment of an improved rotor bearing are shown. FIG. 6A is a cross sectional side view of the bearing, while FIG. 6B is a top view of the bearing, and FIG. 6C is a partial sectioned view of the bearing. Bearing 600 is similar to bearing 500 in that it utilizes a coiled spring 630 to provide an interference fit between the bearing and the inner diameter of the stator. Coil spring 630 is bent into a loop and has its ends welded together to maintain the looped shape. Coil spring 630 is seated within a circumferential groove in the outer periphery 640 of bearing 600. The floor 612 of the circumferential groove is shown as a dashed line in FIG. 6B.

Bearing 600 differs from bearing 500 in several respects. One difference is that bearing 600 includes a set of axial grooves (e.g., 670) that extend from one axial face 601 of the bearing to the axial face 602 at the opposite end of the bearing. These axial grooves allow oil to flow around the bearing (between the bearing and the stator), since there is insufficient space between the floor 612 of the circumferential groove and the inner diameter 611 of collar 610. Since a coiled spring is used as the interference ring to prevent rotation of the bearing within the stator, oil can easily flow axially through the spring. While three axial grooves are shown in FIG. 6B, other embodiments may have more or fewer axial grooves. Also, while the axial grooves in the figure have a rectangular profile (see FIG. 6B), the axial grooves may have other profiles in other embodiments.

Another feature of the Bearing of FIGS. 6A-6C is that the axial grooves have a depth (the radial dimension of the groove) that is different than the depth of the circumferential groove. This can be seen most clearly in FIG. 6C. In this embodiment, axial groove 670 has a greater depth than the circumferential groove, thereby creating two steps (671, 672). These steps help prevent coil spring 630 from rotating within the circumferential groove and thereby prevent the bearing from rotating within the stator. Put another way, the greater depth of the axial groove effectively forms a notch in the floor of the circumferential groove, so that the spring falls into the notch, "keying" the spring with to the collar. Because the coil spring is keyed to the collar and prevented from rotating against the bearing body, any rotation of the bearing/spring assembly within the stator is forced to occur at the point of contact of the spring with the stator inner diameter, rather than at the point of contact of the spring with the collar. With the surface of rotation forced out to a larger radius from the motor shaft, the torque required to rotate the bearing within the stator is increased and the anti-rotation effect is enhanced.

It should be noted that, in the embodiment of FIGS. 6A-6B, the depth of axial groove 670 is greater than the depth of the circumferential groove, but it may be less in other embodiments. In either case, the difference in the depths of the grooves creates steps that help prevent rotation of the spring within the circumferential groove. In other alternative embodiments, the depth of axial groove may be the same as the depth of the circumferential groove.

It should be noted that there may be many alternative embodiments. For example, embodiments may include rotor bearings, motors (e.g., electric submersible pump motors) that utilize bearings as described above, methods of manufacturing or using bearings having the described features, and so on. Alternative embodiments may also include many variations of the features described above. For instance, there may be one or multiple axial grooves, the axial grooves may have round, rectangular, or other profiles, the axial grooves may be deeper, more shallow, or the same depth as the circumferential groove, and the interference ring may have a coil spring structure or other structure that allows axial oil flow. Still other variations may be apparent to those of skill in the art upon reading this disclosure.

The benefits and advantages which may be provided by the present invention have been described above with regard to specific embodiments. These benefits and advantages, and any elements or limitations that may cause them to occur or to become more pronounced are not to be construed as critical, required, or essential features of any or all of the claims. As used herein, the terms "comprises," "comprising," or any other variations thereof, are intended to be interpreted as non-exclusively including the elements or limitations which follow those terms. Accordingly, a system, method, or other embodiment that comprises a set of elements is not limited to only those elements, and may include other elements not expressly listed or inherent to the claimed embodiment.

While the present invention has been described with reference to particular embodiments, it should be understood that the embodiments are illustrative and that the scope of the invention is not limited to these embodiments. Many variations, modifications, additions and improvements to the embodiments described above are possible. It is contemplated that these variations, modifications, additions and improvements fall within the scope of the invention as detailed within the following claims.

What is claimed is:

1. A bearing for a motor in an electric submersible pump system, the bearing comprising:
    a collar, wherein the collar has a bore therethrough, wherein the collar has an outer periphery with a circumferential groove therein, and wherein the outer periphery further has at least one axial groove therein extending from a first axial face at a first end of the collar to a second axial face on an opposite end of the collar;
    a sleeve rotatably positioned within the bore of the collar and coaxially with the collar; and
    an interference ring positioned within the circumferential groove, the interference ring extending radially outward from the groove beyond the outer periphery of the collar, wherein the interference ring allows axial fluid in the axial groove to flow axially through the interference ring.

2. The bearing of claim 1, wherein the interference ring comprises a coil spring.

3. The bearing of claim 2, wherein the coil spring comprises a metal coil spring.

4. The bearing of claim 1, wherein the axial groove has a first depth that is greater than a second depth of the circumferential groove.

5. The bearing of claim 1, wherein the collar has a plurality of axial grooves in the outer periphery thereof, wherein each of the axial grooves therein extends from the first axial face of the collar to the second axial face of the collar.

6. The bearing of claim 1, wherein the at least one axial groove has a rectangular profile, and wherein one or more steps are formed between a floor of the at least one axial groove and a floor of the circumferential groove.

7. An electric submersible pump system comprising:
    a pump and a motor coupled to drive the pump,
    wherein the motor includes
        a stator;
        a rotor positioned coaxially within a bore through the stator; and
        a plurality of rotor bearings that support the rotor within the bore of the stator, wherein each bearing includes
            a collar, wherein the collar has a bore therethrough, wherein the collar has an outer periphery with a circumferential groove therein, and wherein the outer periphery further has an axial groove therein extending from a first axial face at a first end of the collar to a second axial face on an opposite end of the collar,
            a sleeve rotatably positioned within the bore of the collar and coaxially with the collar, and
            an interference ring positioned within the circumferential groove, the extending radially outward from the groove beyond the outer periphery, wherein the interference ring allows axial fluid in the axial groove to flow axially through the interference ring.

8. The electric submersible pump system of claim 7, wherein the interference ring comprises a coil spring.

9. The electric submersible pump system of claim 8, wherein the coil spring comprises a metal coil spring.

10. The electric submersible pump system of claim 7, wherein the axial groove has a first depth that is greater than a second depth of the circumferential groove.

11. The electric submersible pump system of claim 7, wherein the collar has a plurality of axial grooves in the outer periphery thereof, wherein each of the axial grooves therein extends from the first axial face of the collar to the second axial face of the collar.

12. The electric submersible pump system of claim 7, wherein the at least one axial groove has a rectangular profile, and wherein one or more steps are formed between a floor of the at least one axial groove and a floor of the circumferential groove.

* * * * *